United States Patent
Pleasant et al.

(10) Patent No.: US 6,741,139 B2
(45) Date of Patent: *May 25, 2004

(54) OPTICAL TO MICROWAVE CONVERTER USING DIRECT MODULATION PHASE SHIFT KEYING

(75) Inventors: Wayne E. Pleasant, Turners Fall, MA (US); Joseph Chandler, Northampton, MA (US)

(73) Assignee: YDI Wirelesss, Inc., South Deerfield, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/050,689

(22) Filed: Jan. 16, 2002

(65) Prior Publication Data

US 2002/0175776 A1 Nov. 28, 2002

Related U.S. Application Data

(63) Continuation-in-part of application No. 09/863,027, filed on May 22, 2001, now Pat. No. 6,496,079.

(51) Int. Cl.[7] .................................................. H03C 3/00
(52) U.S. Cl. ..................................... 332/103; 375/308
(58) Field of Search ............................... 332/103–105; 375/308, 372

(56) References Cited

U.S. PATENT DOCUMENTS

| | | | |
|---|---|---|---|
| 4,814,773 A | 3/1989 | Wechsberg et al. | 342/368 |
| 4,876,742 A | 10/1989 | Vacon et al. | 455/66 |
| 5,025,487 A | 6/1991 | Eichen | 455/618 |
| 5,331,453 A | 7/1994 | Lipsky | 359/191 |
| 5,365,239 A | 11/1994 | Stilwell, Jr. | 342/368 |
| 5,369,410 A | 11/1994 | Reich | 342/175 |
| 5,617,239 A | 4/1997 | Walker | 359/181 |
| 5,682,256 A | 10/1997 | Motley et al. | 359/117 |
| 5,706,310 A | 1/1998 | Wang et al. | 386/296 |
| 5,710,651 A | 1/1998 | Logan, Jr. | 359/145 |
| 5,784,413 A | 7/1998 | Chen | 375/308 |
| 5,809,395 A | 9/1998 | Hamilton-Piercy et al. | 455/4.1 |
| 5,896,211 A | 4/1999 | Watanabe | 359/124 |
| 5,903,609 A | 5/1999 | Kool et al. | 375/261 |
| 5,966,055 A | 10/1999 | Knoedl, Jr. et al. | 332/103 |
| 5,978,117 A | 11/1999 | Koonen | 359/125 |
| 5,987,303 A | 11/1999 | Dutta et al. | 455/3.1 |
| 5,995,812 A | 11/1999 | Soleimani et al. | 455/119 |
| 6,091,940 A | 7/2000 | Sorrells et al. | 455/118 |
| 6,115,162 A | 9/2000 | Graves et al. | 359/173 |
| 6,118,566 A | 9/2000 | Price | 359/181 |
| 6,222,658 B1 | 4/2001 | Dishman et al. | 359/172 |
| 6,282,180 B1 | 8/2001 | Paneth et al. | 370/330 |
| 6,353,735 B1 | 3/2002 | Sorrells et al. | 455/118 |
| 6,366,620 B1 | 4/2002 | Jackson et al. | 375/308 |
| 6,496,079 B1 * | 12/2002 | Pleasant et al. | 332/103 |

FOREIGN PATENT DOCUMENTS

| | | |
|---|---|---|
| DE | 19705253 | 8/1998 |
| WO | WO99/62229 | 12/1999 |

OTHER PUBLICATIONS

Liu, Q., et al., "Modeling and Experimental Comparison Of Optoelectronic Mixers With The Use of A Metal–Semiconductor–Metal Photodetector," *Microwave and Optical Technology Letters*, 14(3) 173–175 (Feb. 20, 1997).

(List continued on next page.)

*Primary Examiner*—David Mis
(74) *Attorney, Agent, or Firm*—Hamilton, Brook, Smith & Reynolds, P.C.

(57) ABSTRACT

A point-to-point microwave radio link that operates in a Frequency Division Duplex (FDD) mode using direct digital modulation with a Continuous Phase Shift Keyed (PSK) scheme. The transmit signal is generated by a circuit that uses a Voltage-Control Oscillator (VCO) operating in a microwave radio band to obtain the modulated signal. The VCO output is fed to a phase modulator to obtain the modulated signal. The output of the VCO is then frequency multiplied by the predetermined factor to produce the modulated microwave output signal at the desired band.

14 Claims, 4 Drawing Sheets

OTHER PUBLICATIONS

Stone, R., et al., "Independent Phase and Magnitude Control of an Optically Carried Microwave Signal with a Three-Terminal Vertical-Cavity Surface-Emitting Laser," *IEEE Photonics Technology Letters*, 11(4)463-465 (Apr. 1999).

Nicoletti, P., et al., "STRATUM: Broadband Wireless Transport for Ethernet and T1," 4 pages, Proxim, Inc. (Feb. 2000).

Secco, P., et al., "Multi-Service Broadband Wireless Access Solutions" (Harris Corporation) . Paper presented at the SUPERCOMM 2000 Trade Show, Atlanta, Georgia (Jun. 6-8, 2000).

BreezeCOM—Company Info. Network Buyer's Guide [online], May 2001 [retrieved on May 2, 2001]. Retrieved from the Internet http://www.networkbuyersguide.com/search/271000.htm.

Cisco Aironet 340 Series Ethernet Bridges—Building-to-Building Wireless Solutions [online], May 2001 [retrieved on May 2, 2001]. Retrieved from the Internet http://www.cisco.com/warp/public/cc/pd/witc/ao340ap/prodlit/airbo_ds.htm.

Wireless—CNP [online], May 2001 [retrieved May 2, 2001]. Retrieved from the Internet http://www.cnpgb.com/microwave-point-to-point.htm.

GigaLink Overview [online], May 2001 [retrieved May 2, 2001]. Retrieved from the Internet http://www.hxi.com/overview.html.

High Speed Wireless LANS [online], May 2001 [retrieved May 2, 2001]. Retrieved from the Internet http://www.halcyon.com/routers/main.htm.

Micropass® 8000 Series [online], May 2001 [retrieved May 2, 2001]. Retrieved from the Internet http://www.racon.com/racon/mp_8000b.html.

Microwave Networks [online], May 2001 [retrieved May 2, 2001]. Retrieved from the Internet http://www.halcyon.com/routers/wireless/interbuilding.htm.

Nortel Networks: Products & Services—Internet Broadband Wireless Access System 3100 [online], May 2001 [retrieved May 2, 2001]. Retrieved from the Internet http://www.nortelnetworks.com/products/01/rts/x30_sdh/index.html.

Proxim—Company Info [online], May 2001 [retrieved May 2, 2001]. Retrieved from the Internet http://www.networkbuyersguide.com/search/292000.htm.

Proxim—Building-to-Building Products [online], May 2001 [retrieved May 2, 2001]. Retrieved from the Internet http://www.proxim.com/products/bldg/bldg.shtml.

Proxim—RL2 Ethernet and Token Ring Access Points Datasheet [online], May 2001 [retrieved May 2, 2001]. Retrieved from the Internet http://www.proxim.com/products/r12/ethtrap.shtml.

RACON—25 years of excellence in security & communications [online], May 2001 [retrieved May 2, 2001]. Retrieved from the Internet http://www.racon.com/.

RACON—Micropass 8100 Series Data Sheet [online], May 2001 [retrieved May 2, 2001]. Retrieved from the Internet http://www.racon.com/racon/mp_8100.html.

RACON's Wireless LAN/MAN Systems [online], May 2001 [retrieved May 2, 2001]. Retrieved from the Internet http://www.racon.com/racon/lan.html.

RadioLAN—Home of the 10Mbps Wireless LAN [online], May 2001 [retrieved May 2, 2001]. Retrieved from the Internet http://www.radiolan.com.

Solectek Corporation Wireless Bridges and Routers [online], May 2001 [retrieved May 2, 2001]. Retrieved from the Internet http://www.solectek.com/.

The Solutions Group: The Interbuilding Link 4MBPS [online], May 2001 [retrieved May 2, 2001]. Retrieved from the Internet http://www.halcyon.com/routers/ibl4mbps.htm.

The Solutions Group: Wireless Bridge and Microwave Provide LAN-to-LAN Connectivity [online], May 2001 [retrieved May 2, 2001]. Retrieved from the Internet http://www.halcyon.com/routers/ibl10mbps.htm.

The Solutions Group: Alternative Wireless Innovations for Interbuilding Connectivity [online], May 2001 [retrieved May 2, 2001]. Retrieved from the Internet http://www.halcyon.com/routers/500wsl.htm.

The Solutions Group: Wireless Products [online], May 2001 [retrieved May 2, 2001]. Retrieved from the Internet http://www.halcyon.com/routers/prod03.htm.

Camnet Inc.—10 MBPS InterBuilding Link [online], May 2001 [retrieved May 2, 2001]. Retrieved from the Internet http://www.camnetinc.com/text/wprod/mb10.htm.

Windata Wireless Networking [online], May 2001 [retrieved May 3, 2001]. Retrieved from the Internet http://www.swanassoc.com/test/windata.htm.

\* cited by examiner

OPTICAL TO MICROWAVE CONVERTER USING DIRECT MODULATION PHASE SHIFT KEYING

CROSS REFERENCE TO RELATED APPLICATIONS

This application is a continuation-in-part of a prior U.S. patent application Ser. No. 09/863,027 filed May 22, 2001 now U.S. Pat. No. 6,496,079 entitled "Optical to Microwave Converter Using Direct Modulation Phase Shift Keying," assigned to Telaxis Communications Corporation, the assignee of the present application, the teachings of which are incorporated herein by reference.

BACKGROUND OF THE INVENTION

The need to transport high-bandwidth signals from place to place continues to drive growth in the telecommunications industry. As the demand for high-speed access to data networks, including both the Internet and private networks, continues to evolve, network managers face an increasing need to transport data signals over short distances. For example, in corporate campus environments, it is often necessary to implement high-speed network connections between buildings rapidly and inexpensively, without incurring commitments for long-term service contracts with local telephone companies. Other needs occur in residential areas, including apartment buildings, and even private suburban neighborhoods. Each of these settings requires efficient distribution of high-speed data signals to a number of locations.

An emerging class of products provides a broadband wireless access solution via point-to-point communication links over radio carrier frequencies in the microwave radio band. The telecommunications transport signals may be provided on a wire, but increasingly, these are provided on optical fiber media. An optical to electrical conversion stage is thus first required to convert the baseband digital signal. Next, a microwave frequency radio is needed to up-convert the broadband digital signal to a suitable radio carrier frequency. These up-converters are typically implemented using multi-stage heterodyne receivers and transmitters such that the input baseband signal is modulated and then up-converted to the desired radio frequency. In the case of an OC-3 rate optical transport signal having a bandwidth of 155 MegaHertz (MHz), the input signal may be up converted to an ultimate microwave carrier of, for example, 23 GHz, through several Intermediate Frequency (IF) stages at lower radio frequencies.

Other implementations may use optical technologies to transport the signal over the air. These technologies use optical emitters and detectors operating in the high infrared range. While this approach avoids conversion of the optical input to an electrical signal, it has certain limitations. First, the light wave carrier has a narrow beamwidth, meaning that the transmitter and receiver must be carefully aligned with one another. Light wave carriers are also more susceptible to changes in physical conditions. These changes may be a result of changes in sunlight and shade exposure, or foreign material causing the lenses to become dirty over time. Other problems may occur due to vibrations from nearby passing automobiles and heating ventilating and cooling equipment. Some members of the public are concerned with possible eye damage from high powered lasers.

SUMMARY OF THE INVENTION

The present invention is a point-to-point microwave radio link that operates in a Frequency Division Duplex (FDD) mode using separate microwave band radio frequency carriers for each direction. The transmitter uses direct digital modulation to convert an input baseband optical rate signal to the desired microwave frequency carrier. The direct digital modulation is implemented using a Phase Shift Keyed (PSK) scheme. The design may be targeted for operation at unallocated frequencies in the millimeter wave spectrum, such from 40–320 GHz.

In one embodiment, the transmitter is implemented using a direct multiplication followed by a phase shifter. With this arrangement, the transmitter uses a stable voltage controlled oscillator operating in the 10–13 GHz band. The oscillator output is then up-converted to the desired microwave range. For operation in the 40–52 GHz range, this may be a single stage times four (×4) frequency multiplier for operation at a higher range, such as from 81–87 GHz, a second, times two (×2) multiplier may also be employed.

The frequency multiplier output feeds a phase modulator and/or attenuator circuit. In particular, the frequency multiplier output is fed to a phase modulator that deviates the phase of the multiplied output carrier by a desired amount. The phase deviator may be one or more circulators in this preferred embodiment. A bandpass filter and power amplifier may typically be inserted prior to the phase shifter.

The direct digital modulation transmitter may also be implemented using a sub-phase implementation. In this approach, a stable voltage controlled oscillator operating in the 10–13 Giga Hertz (GHz) band is once again used. This oscillator feeds a phase modulator circuit that operates over a narrower phase range than would otherwise typically be used. For example, the phase deviation range is typically only a fraction of the ultimately desired phase deviation range of the output microwave signal. The phase modulator is thus preferably chosen so that it deviates the phase by a desired output amount divided by a particular factor.

That same particular factor is then used by an output frequency multiplier to multiply the phase modulated signal to a higher output carrier frequency. A bandpass filter and power amplifier may then be used to feed a final stage filter prior to forwarding the signal to a transmit antenna.

The phase deviation of the phase modulator in this sub-phase embodiment is preferably chosen to be the reciprocal of the multiplication factor implemented by the frequency multiplier. For example, the phase modulator may implement phase shifts of 0, 22.5, 45, and 67.5 degrees when a frequency multiplier having a multiplication factor of four (4) is applied to an input 10 GHz range VCO signal. After being subjected to the multiplication body output multiplier, the desired output phases of 0, 90, 180, and 270 degrees are provided.

Likewise, in a case where a multiplication factor of 8 is introduced in the output signal processing chain, the phase deviation may be further reduced accordingly. In such an instance, where the output carrier signal generated from the 10 GHz VCO is ultimately multiplied up to a range of 80 GHz, the sub-angle phase deviations implemented by the phase modulator would be 0, 11.5, 22.5, and 33.75 degrees.

If amplitude modulation is also desired, an attenuator may be inserted in-line prior to the phase deviator. This allows multi-level modulation schemes such as QAM to be employed.

The receiver uses a similar but inverse signal chain consisting of a microwave oscillator, frequency multiplier, and bandpass filter. A single down conversion stage is all that is required. By inserting the frequency multiplier between the oscillator and down converter mixer, the local oscillator remains offset by a wide margin from the input RF carrier frequency. This permits the receiver image reject filters to be implemented more easily.

This scheme provides a low cost alternative to traditional approaches, since the base band modem and multiple RF stages are eliminated. Because there are no heterodyne stages, there also are no images of the modulated baseband signals created on either side of the carrier frequency. Thus, image reject filters are not necessary.

Direct digital modulation also only creates modulation artifacts at high multiples of the VCO center frequency. This allows the output bandpass filters to be implemented using inexpensive waveguide technologies that can easily reject the harmonics of the VCO output, as opposed to more stringent filters that might otherwise be required to reject the harmonics of the baseband signal.

Figure 1:
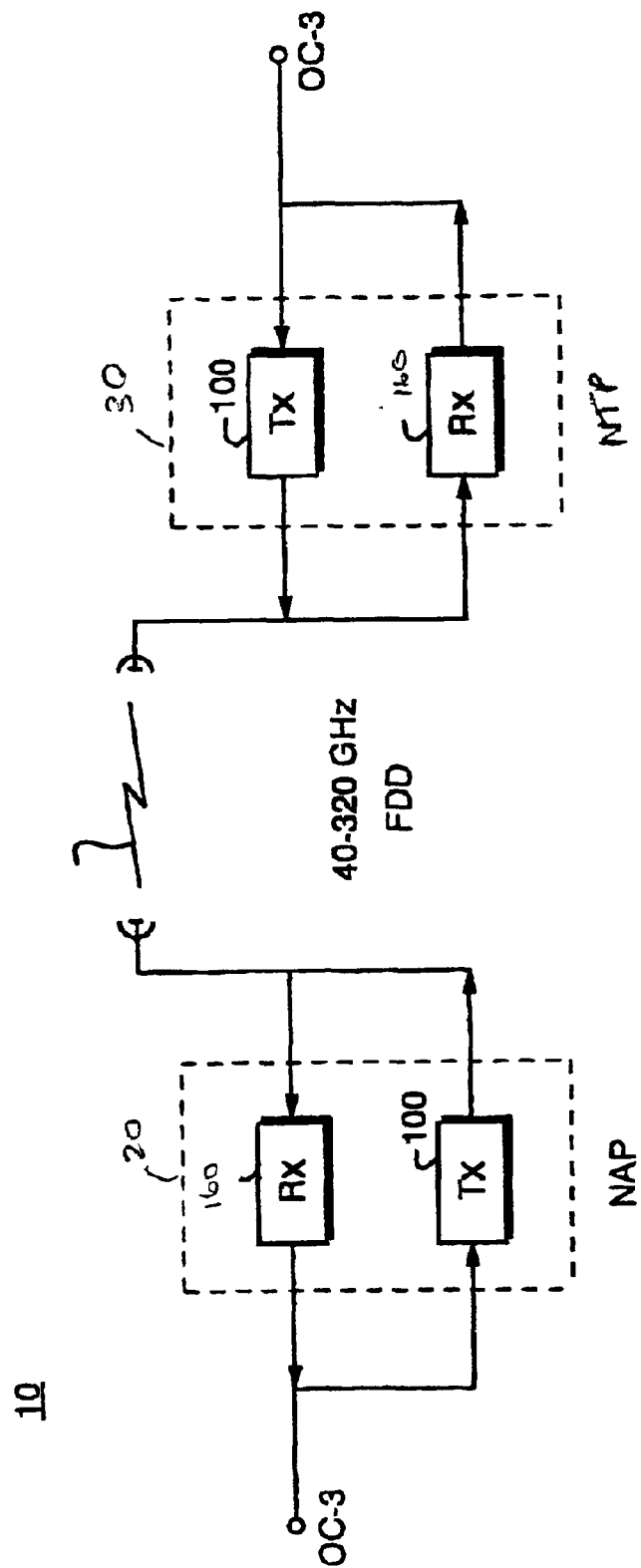
FIG. 1 is a block diagram of a point-to-point, optical to microwave link according to the invention.

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

A description of preferred embodiments of the invention follows.

FIG. 1 is a block diagram of a point-to-point wireless communications system that may make use of a direct conversion transmitter and receiver according to the invention. The system 10 includes at least a pair of optical-to-microwave link interfaces 20, 30. A first optical-to-microwave link interface may be located, for example, at a central location such as a Network Access Point (NAP) 20 that provides connections to a data network. In the illustrated example, the network connection is provided from an optical fiber that carriers a transport signal modulated in accordance with the OC-3 standard signaling format. The OC-3 optical signal carries an information signal having a data rate of 155.52 Megabits per second (Mbps). A similar optical-to-microwave converter unit 30 is located at another remote location, such as a Network Termination Point (NTP). The unit 30 also provides connectivity to a similar OC-3 optical transport connection. The units 20, 30 may, for example, be located on the roofs of buildings in a campus environment to which it is desired to provide high-speed network connections between buildings.

In any event, both units 20 and 30 each have a transmitter 100 and receiver 160. The transmitters 100 and receivers 160 operate in a Frequency Division Duplex (FDD) mode, such that transmitter-receiver pairs operate on distinct carrier frequencies. For example, in a downlink direction from unit 20 towards unit 30, the transmitter 160 in unit 20 operates on the same microwave carrier frequency to which the receiver 100 in unit 30 is tuned. Likewise, the receiver 160 in unit 20 is tuned to the microwave carrier which the transmitter 100 in unit 30 operates.

Acceptable operating frequencies for the uplink and downlink may be in an unlicensed microwave band. For example, in the United States, appropriate unlicensed microwave radio bands occur in the various regions of the 40 to 320 GHz band.

It should be understood that units 20 and 30 may be deployed at any short haul point-to-point locations, such that the specific locations are in effect network peers. It should also be understood that the invention may be used to carry data traffic between different types of locations and different types of network traffic.

Figure 2:
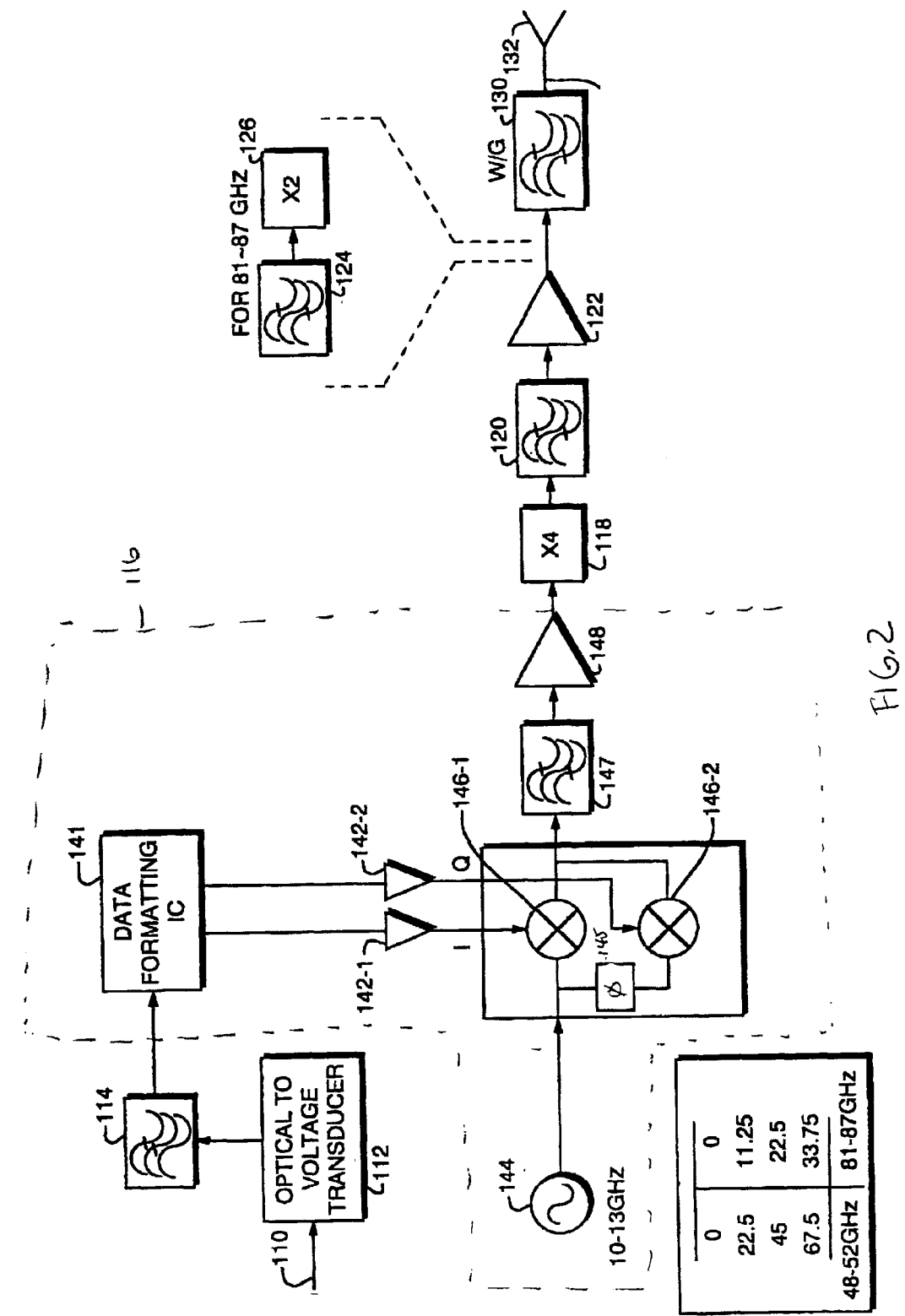
FIG. 2 is a detailed circuit diagram of a Direct Modulation Phase Shift Keyed (PSK) transmitter that uses post-multiplication phase modulation.

Turning attention now to FIG. 2, a post multiplication phase shift embodiment of the transmitter 100 will be described in greater detail. The transmitter 100 includes an optical to voltage transducer 112, a baseband filter 114, and a direct phase modulator 116. The circuit also utilizes a multiplier 118, a bandpass filter 120, a buffer amplifier 122, an output waveguide filter 130, and a transmit antenna 132. Optionally, a second-stage bandpass filter 124 and multiplier 126 may be utilized.

The direct phase modulator 116 includes a data formatting integrated circuit (IC) 141, a pair of buffers 142-1, 142-2, a local oscillator 144, a phase shifter 145, a pair of phase modulators 146-1, 146-2, a bandpass filter 147 and amplifier 148. As will be understood shortly, the signal radiated by the transmitter 100 in this embodiment has a continuous phase and employs Quadrature Phase Shift Keyed (QPSK) modulation in order to communicate information to the receiver 150.

The input OC-3 formatted optical signal is first fed to the optical to voltage transducer 112. The transducer 112 produces at its output a raw transport bitstream. For an input optical signal of the OC-3 format, the transport bit stream is a digital signal at a 155.52 Mbps rate. The raw transport bit stream is then fed to a lowpass filter 114 to remove any artifacts of the optical to voltage conversion process. It should be understood that other digital input signal types maybe supported, such as OC-1, OC-12 or other optical range transport signals.

After being converted to a voltage from the optical carrier, the input baseband signal is directly fed to the control inputs of the data formatter 141. For QPSK operation, the data formatter 141 drives the phase modulator 116 only. The phase modulator 116 provides a phase-deviated microwave carrier at its output, which shifts in phase according to the logic state of the input transport signal.

The frequency of the local oscillator 144 portion of the direct phase modulator 116 is determined by the multiplication factor implemented by the following multiplier 118, and optional multiplier 126. For example, given an OC-3 input signal and a desired output signal in the range of 48–52 GHz, the carrier signal output by the modulator 116 may be in the range of from 10–13 GHz. The oscillators used in the VCO 144 are therefore not particularly narrow band or stable at such high operating ranges in the 40 GHz and above range. Thus, the approach here is to use a more stable VCO 144 source at a lower range, such as in the 10–13 GHz range, and then to rely upon the multiplier 118 and/or 126 to shift the VCO output up to the desired operating band.

The first-stage bandpass filter 120 removes artifacts of the direct modulation process. Unlike heterodyne receivers, no sidebands are created. Artifacts of the direct modulation process occur only at multiples of the VCO 144 carrier and not at image frequencies and no RF sidebands are generated. Thus, the first-stage bandpass filter 120 need only remove the 10–13 GHz range harmonics on either side of the output 50 GHz range carrier frequency. It therefore need not be a particularly sharp roll off filter.

A medium range buffer amplifier 122 then receives the filtered signal and forwards it to an output waveguide filter 130.

The waveguide filter 130 further reduces the harmonics of the VCO 144. It need not be an image-reject filter. Such image-reject filters, if they were needed, would further increase the cost. Elimination of the heterodyne stages, while not providing as bandwidth efficient an approach, does produce a less expensive radio.

As can now be appreciated, this approach implements direct digital modulation using a sub-phase deviation approach. In particular, the output signal is generated by first using a stable voltage controlled oscillator to produce a signal in a band that is a sub-multiple of the ultimately desired output microwave frequency carrier. The VCO output signal is then subjected to a phase modulator that deviates the phase by a desired phase amount that has been divided by a particular factor. This same particular factor is then used by an output frequency multiplier to multiply the resulting phase modulated microwave signal to the desired higher output carrier frequency. The phase deviation of the modulator is thus chosen to be the reciprocal of the multiplication factor implemented by the frequency multiplier.

For example, if the frequency multiplication factor of 4 is to be applied to the output of the VCO, and the QPSK implementation is to ultimately provide output signals at phases of 0, 90, 180, and 270 degrees, the input phase modulator implements phase shifts of 0, 22.5, 45, and 67.5 degrees, respectively.

In a case where a multiplication factor of 8 is introduced in the output signal processing chain, the phase deviation is one-eighth of the ultimately desired amount. Thus, in such an instance, when, for example, an output carrier signal of 80 GHz is generated from a 10 GHz range of VCO, the sub-angle phase deviation implemented by the phase modulator 116 is in steps of 0, 11.25, 22.5, and 33.75, respectively.

It should also be noted that the amplifiers operate in a saturation mode, which is a significant advantage of the present invention. Specifically, by operating in this mode and using direct modulation, the amplifiers do not need linearity requirements that would otherwise be required if heterodyne approaches that are used in the prior art were used. Because the amplifiers need not operate in their linear region, temperature compensation requirements are relaxed and higher power operation is easier to achieve with simpler circuits. In our experience with the prior art, when heterodyne modulation techniques are used that require linear amplifiers, temperature, temperature compensation schemes utilizing Programmable Read Only Memories (PROM) to adjust amplifier outputs levels were generally required at the indicated output frequency ranges of 40 to 80 GHz.

Figure 3:
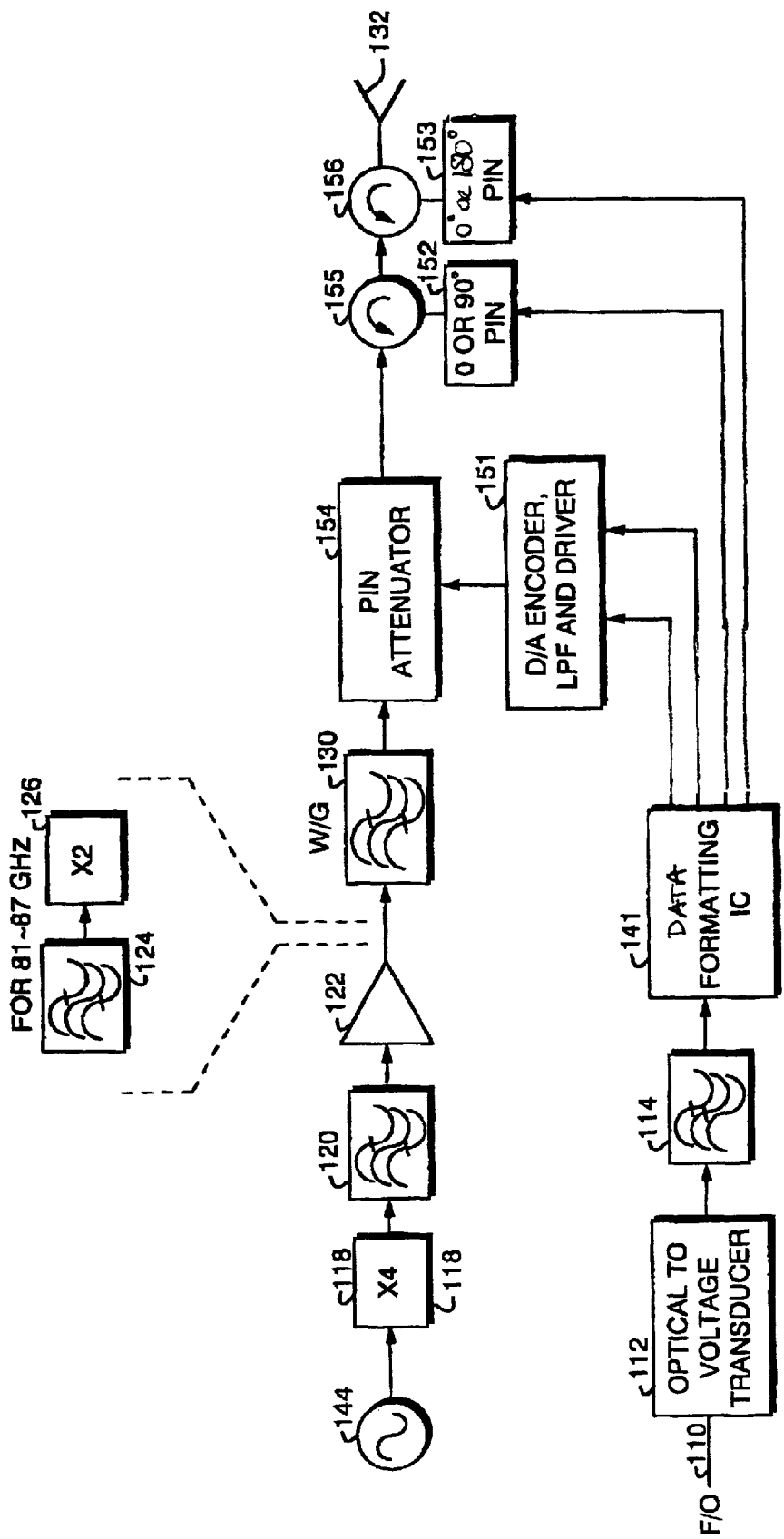
FIG. 3 is a detailed circuit diagram of another embodiment of a Direct Modulation PSK transmitter that uses sub-phase deviation prior to carrier multiplication.

Another embodiment of the present invention that may be used to generate a Quadrature Amplitude Modulated (QAM) output signal via post multiplication phase modulation is shown in FIG. 3. The QAM implementation represents a generalization of the PSK case, as QAM provides a way for the amplitude of the transmitted signal to also communicate information as well as the phase.

As seen in FIG. 3, this configuration receives the input optical signal 110 and feeds it to an optical to voltage transducer 112, filter 114, and data formatting integrated circuit 141 as for the QPSK embodiment described above. However, with this implementation, the direct phase modulation technique is somewhat different. Rather than phase-modulate the carrier before multiplication, phase and optional amplitude modulation are introduced after carrier multiplication.

More specifically, a carrier signal is generated by a local oscillator 144 that feeds a multiplier 188, a band-pass filter 120, a buffer amplifier 122, and an output waveguide filter 130 as in the previously described embodiment. Optionally, as before, a second stage band-pass filter 124 and multiplier 126 may be utilized to achieve 80 GHz operation.

The phase modulation is provided post-multiplication by feeding the data bits output by the formatter 141 to a Digital to Analog (D/A) converter 151 and a pair of PIN diodes 152 and 153. The generated microwave carrier signal is then fed from the waveguide filter 130 to a PIN attenuator 154 which in turn feeds a pair of circulators 155 and 156. The signal output from the circulator 156 is then fed to the antenna 132.

The combination of the PIN diodes 152 and 153 and circulators 155 and 156 implement one of four different phase shifts, as controlled by the least significant data bits 150-1 and 150-2 output by the formatter 141. These two least significant data bits are fed to a respective one of the PIN attenuators 152 and 153. They implement a 0 or 90 degree phase shift, in the case of the PIN attenuator 152, and a 0 or 180 degree phase shift, in the case of PIN attenuator 153. Thus, it can be considered that a first one of the PIN diodes implements a first phase shift, P1, and a second 153 implements a second phase shift, P2. The PIN diodes 152 and 153 reflect the input signal into either of two phases, e.g. into either one of two signal paths, and the reflected signal is then fed out to the respective one of the circulators 155 and 156.

The data formatting integrated circuit 141 provides data outputs 150-3 and 150-4 that represent encoded data bits. In the illustrated embodiment, this may be a total of as many as four different data bits represented by 16 different states of the modulated carrier. In the case where four data bits are selected, then the implementation provides for sixteen level QAM signaling at the output. The two most significant bits are used to determine a modulated signal amplitude. The two least significant bits a modulated signal phase as for the QPSK case.

The D/A converter 151 may thus include a digital to analog conversion process for generating an analog voltage from the two most significant data bits 150-3 and 150-4. The voltage output from this D/A converter 151 drives the PIN attenuator 154. The PIN attenuator 154 attenuates the signal amplitude output from the waveguide filter 130 by a desired amount as indicated by the data bits 150.

Figure 4:
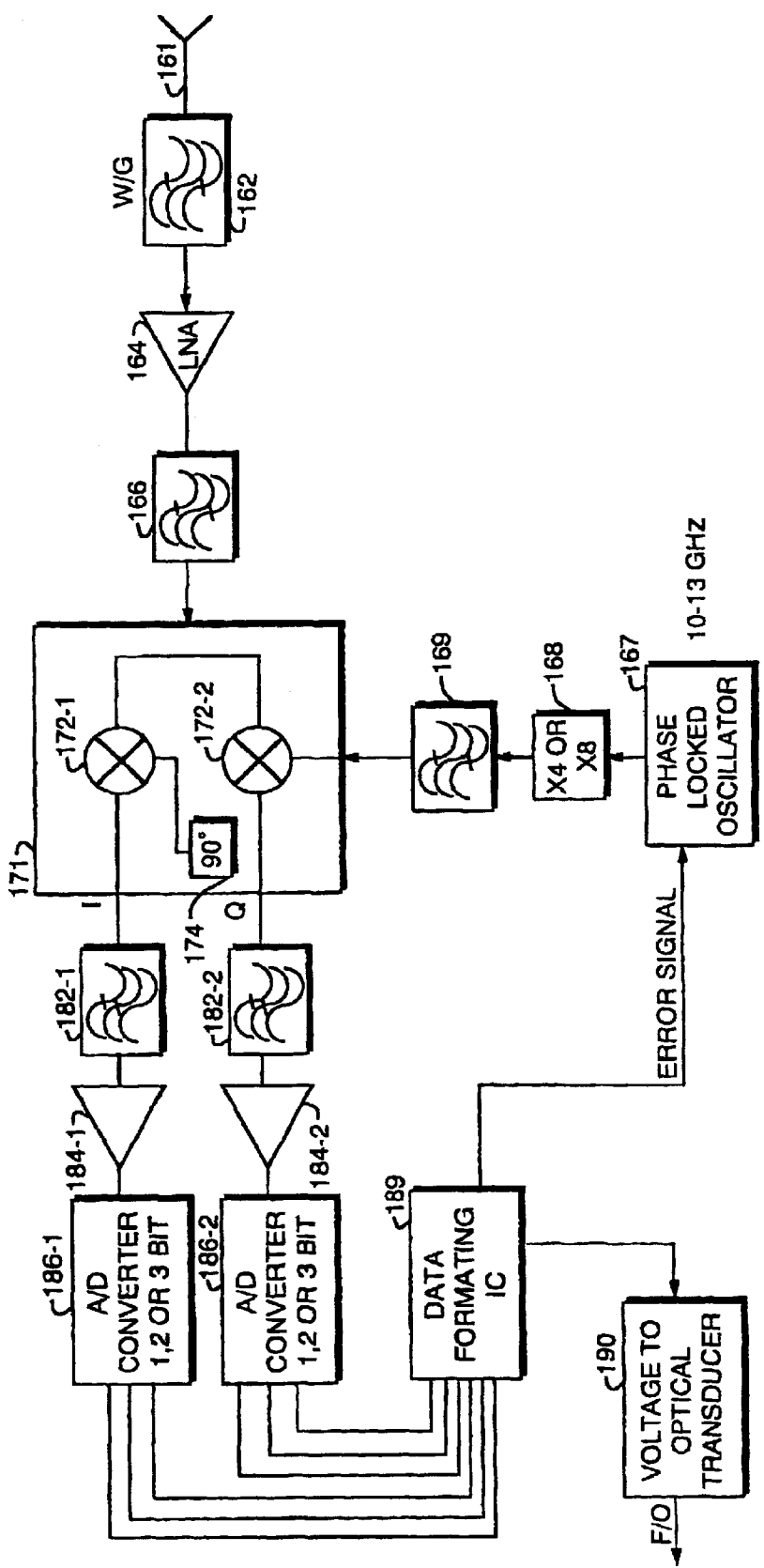
FIG. 4 is a detailed circuit diagram of a Direct Modulation receiver.

In FIG. 4, an exemplary receiver 160 for the PSK signals generated by the circuit of FIG. 2 or 3 is described in detail. The receiver 160 includes a receive antenna 161, an input waveguide filter 162, a low-noise amplifier 164, a bandpass filter 166, a local reference generator 170, a phase demodulator 171, a pair of lowpass filters 182-1, 182-2, a pair of buffer amplifiers 184-1, 184-2, a pair of analog to digital (AD) converters 186-1, 186-2, a data formatting integrated circuit 189 and a voltage to optical transducer 190.

The input signal provided by the receiver antenna 161 is fed to the waveguide filter 162. This filter, having a center frequency in the 50 or 85 GHz range as the case may be, filters the desired signal from the surrounding background signals.

The low-noise amplifier 164 may be implemented as a Monolithic Microwave Integrated Circuit (MMIC) feeding a planar bandpass filter 66 in the 50 or 85 GHz range. The low-noise amplifier 164 typically has a 6–8 decibel (dB) noise figure providing 10–20 decibels of gain.

The local oscillator reference generator 170 consists of a 10–13 GHz oscillator 167, frequency multiplier 168, and bandpass filter 169. These components are identical to the corresponding components in the transmitter. Note here that the multiplication factor 168 may be implemented by one or more individual frequency multipliers although only a single block is shown in the diagram.

The phase demodulator 171 includes a pair of image reject mixers 172-1 and 172-2 offset in quadrature by the phase shifter 174. As is well known in the art, the heterodyning of a local reference signal as generated by the reference oscillator 170 when mixed against the incoming signal from the antenna 161 will produce an in-phase (II) and quadrature (Q) versions of the input signal. The lowpass filters 182-1 and 182-2 provide the baseband information to a pair of respective buffer amplifiers 184-1, 184-2. Thus the resulting signal is the basic 55.52 MHz information that was phase modulated onto the microwave frequency carrier. In a case where the information is coded as QPSK, each signal output by the buffer amplifier may actually represent two different bits. The respective A/D converters 186-1 and 186-2 thus perform the required two-bit conversion. The data formatting IC 189 then reformats this data to be fed to the optical to voltage transducer 190.

The oscillator 167 may receive an error correction signal from the data formatting IC. In such an instance, a phase locked oscillator 167 is provided, in a manner which is well known in the art.

Different implementations of QAM modulation would require different implementations of A/D converters 186. For example, if binary phase shift keying (BPSK) is implemented the AID converters 186 require only a single bit conversion; if however, if 8 level QAM is implemented by such for example the circuit of FIG. 3, then three bit A/D) converters would be necessary. Likewise, if the level QAM is used, the A/D converts should have at least 4 bit accuracy.

It should be understood that various alternate arrangements of the two described embodiments are possible. For example, in the sub-phase deviation embodiment of FIG. 2, there may be introduced attenuators at one or more places in the signal chain in order to accommodate QAM type modulation. For example, an attenuator might be implemented at the output of amplifier 148 prior to multiplication by multiplier 118.

In a similar vein, the embodiment of FIG. 3 may be utilized to generate a QPSK modulated signal through the elimination of the pin attenuator 154 and using the data formatter 141 to simply drive the circulators 155 and 156.

The present invention also enjoys an advantage in the receiver design in that variable data rate modulated signals may be easily accommodated. In particular, by avoiding the use of heterodyning schemes, an asynchronous detection scheme is possible. This is important in that it also tends to reduce the cost of an entire system.

The invention thus provides for direct modulation of the input bitstream utilizing Continuous Phase Shift Keying. No manipulation of the bitstream is required such as in the case of baseband to heterodyne conversion approaches. Furthermore, because of the direct up-conversion to the desired microwave frequency carrier, multiple heterodyne stages are eliminated. Heterodyne stages, while providing for efficient filtering topologies, have been found to create interference and spurious noise problems and typically require temperature compensation at microwave operating frequencies.

By directly modulating the carrier source, such as provided by a voltage-control oscillator at a phase deviation less than the desired ultimate deviation rate by a factor of 1/n, with n being the multiplication factor in the up-conversion chain, the overall design is greatly simplified. Standard microwave component building blocks can be used in a highly-producible assembly as a result.

While this invention has been particularly shown and described with references to preferred embodiments thereof, it will be understood by those skilled in the art that various changes in form and details may be made therein without departing from the scope of the invention encompassed by the appended claims.

What is claimed is:

1. A transport to microwave radio frequency adapter that accepts an input telecommunications transport signal on an input port and converts information in such signal to a desired microwave Radio Frequency (RF) carrier, the input transport signal carrying information at an input bit rate, the apparatus comprising:

a phase encoder, coupled to receive the transport signal, the phase encoder implementing a Phase Shift Keyed (PSK) encoding such that at least first phase is selected to indicate a first logical value for an input data bit in the transport signal and a second phase is selected to indicate a second logical value for an input data bit in the transport signal, the deviation between the two phases selected to be equal to a predetermined value;

a local reference oscillator, connected to provide a first microwave carrier;

a frequency multiplier, connected to receive the output of the local reference oscillator and to multiply the output thereof to a desired microwave RF carrier frequency; and a phase modulator, connected to impart a direct phase modulation to the microwave RF carrier.

2. An apparatus as in claim 1 wherein the telecommunications transport signal is provided on an optical physical medium.

3. An apparatus as in claim 2 additionally comprising:

an optical-to-voltage transducer connected to receive the telecommunications signal and to provide a baseband electrical signal at an output.

4. An apparatus as in claim 1 wherein the frequency multiplier implements a multiplication factor.

5. An apparatus as in claim 4 wherein the frequency multiplier is implemented in a plurality of frequency multiplication stages.

6. An apparatus as in claim 1 wherein the phase modulator and frequency multiplier perform a direct phase conversion of the input transport signal to the microwave RF carrier.

7. An apparatus as in claim 6 wherein the direct conversion is performed without using the input transport signal to modulate an intermediate carrier signal.

8. An apparatus as in claim 1 additionally comprising:

a microwave bandpass filter connected to the output of the frequency multiplier to filter harmonics of the carrier frequency of the voltage-controlled oscillator.

9. An apparatus as in claim 1 additionally comprising:
a microwave RF to transport adapter, to convert a received microwave RF signal to a transport signal carrying an output telecommunications transport signal.

10. An apparatus as in claim 9 wherein the microwave RF to transport adapter further comprises:
an oscillator, operating at a carrier frequency which is a predetermined fraction of a desired direct down-conversion frequency;
a frequency multiplier, connected to receive the oscillator output, and to multiply the oscillator output up to the desired direct down-conversion frequency; and
a mixer, coupled to the frequency multiplier and the microwave RF signal, to provide a down-converted transport signal.

11. An apparatus as in claim 1 wherein the phase modulator implements a sub-phase deviation phase shift prior to the frequency multiplier.

12. An apparatus as in claim 11 wherein the sub-phase deviation phase shift is equal to an output desired phase shift divided by a frequency multiplier factor implemented by the frequency multiplier.

13. An apparatus as in claim 1 wherein the phase modulator implements a phase deviation after the frequency multiplier.

14. An apparatus as in claim 13 wherein the phase modulator imports a direct phase shift to the microwave RF carrier.

* * * * *